US010025611B2

(12) United States Patent
Figueroa et al.

(10) Patent No.: US 10,025,611 B2
(45) Date of Patent: Jul. 17, 2018

(54) SERVER BUILD OPTIMIZATION

(71) Applicant: INTERNATIONAL BUSINESS MACHINES CORPORATION, Armonk, NY (US)

(72) Inventors: Jose R. Figueroa, Frisco, TX (US); Robert Filepp, Yorktown Heights, NY (US); William J. Hladik, Jr., Charlotte, NC (US); Brian Peterson, Ridgefield, CT (US); Frederick Y. Wu, Yorktown Heights, NY (US); Christopher C. Young, Yorktown Heights, NY (US); Sai Zeng, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 128 days.

(21) Appl. No.: 14/918,100

(22) Filed: Oct. 20, 2015

(65) Prior Publication Data
US 2017/0109186 A1 Apr. 20, 2017

(51) Int. Cl.
*G06F 9/455* (2018.01)
*G06F 8/61* (2018.01)

(52) U.S. Cl.
CPC ............ *G06F 9/45558* (2013.01); *G06F 8/61* (2013.01); *G06F 2009/45562* (2013.01)

(58) Field of Classification Search
CPC .......... G06F 8/61; G06F 8/63; G06F 9/45558; G06F 2009/45562
(Continued)

(56) References Cited

U.S. PATENT DOCUMENTS 7,203,864 B2 * 4/2007 Goin ................ G06F 11/008
                                                  702/183
7,912,749 B2    3/2011 Wong et al.
(Continued)

FOREIGN PATENT DOCUMENTS

EP       1557778        7/2005
EP       2015511        1/2009
(Continued)

OTHER PUBLICATIONS

Birendra Gosai, "building the next-generation data center—a detailed guide", CA Technologies, 2011, pp. 1-24.
(Continued)

*Primary Examiner* — Benjamin Wu
*Assistant Examiner* — Willy W Huarcha
(74) *Attorney, Agent, or Firm* — F. Chau & Associates, LLC

(57) ABSTRACT

A method to perform server provisioning on a plurality of computer systems to generate a plurality of target virtual machines includes: obtaining configurations from a pool comprising at least one existing candidate virtual server or server image through a discovery process; performing a clustering analysis on the configurations to group the configurations into at least two groups; and for each group, selecting a configuration from among the configurations of the group as a candidate virtual machine image; determining a cost of actions required to be performed on the candidate virtual image to result in target virtual machines with a same configuration as the configurations of the group; and selecting the candidate virtual image with the lowest cost.

15 Claims, 7 Drawing Sheets

(58) Field of Classification Search
USPC .......................................................... 718/1
See application file for complete search history.

(56) References Cited

U.S. PATENT DOCUMENTS

| | | | |
|---|---|---|---|
| 8,056,082 B2 | 11/2011 | Koretz et al. | |
| 8,185,624 B2* | 5/2012 | Pal ........................... | G06F 8/61 |
| | | | 705/51 |
| 2002/0112232 A1* | 8/2002 | Ream ....................... | G06F 8/61 |
| | | | 717/176 |
| 2006/0136490 A1 | 6/2006 | Aggarwal et al. | |
| 2011/0265087 A1 | 10/2011 | Chen et al. | |
| 2012/0110567 A1* | 5/2012 | Lyons ....................... | G06F 8/61 |
| | | | 717/177 |
| 2012/0131577 A1* | 5/2012 | Arcese ...................... | G06F 8/60 |
| | | | 718/1 |
| 2012/0215336 A1 | 8/2012 | Yucel et al. | |
| 2013/0024573 A1* | 1/2013 | Kushida ................ | G06F 9/5077 |
| | | | 709/226 |
| 2013/0117676 A1* | 5/2013 | De Pauw .................. | G06F 3/00 |
| | | | 715/738 |
| 2013/0174117 A1* | 7/2013 | Watters ..................... | G06F 8/71 |
| | | | 717/106 |
| 2013/0232480 A1* | 9/2013 | Winterfeldt ............... | G06F 8/60 |
| | | | 717/177 |
| 2013/0246422 A1* | 9/2013 | Bhargava .......... | G06F 17/30017 |
| | | | 707/737 |
| 2014/0075435 A1* | 3/2014 | Assuncao ........... | G06F 9/45558 |
| | | | 718/1 |
| 2015/0089494 A1* | 3/2015 | Beak .................. | G06F 9/45558 |
| | | | 718/1 |
| 2015/0170333 A1* | 6/2015 | Jing ......................... | G06T 3/40 |
| | | | 345/660 |
| 2017/0052772 A1* | 2/2017 | Chen ........................ | G06F 8/60 |

FOREIGN PATENT DOCUMENTS

| | | |
|---|---|---|
| EP | 2028592 | 2/2009 |
| EP | 2610807 | 7/2013 |
| WO | 0239257 | 6/2002 |
| WO | 2013082119 | 6/2013 |

OTHER PUBLICATIONS

Jim Metzler, "Service Orchestration: The Key to the Evolution of the Virtual Data Center", Webtorials Editorial/Analyst Division, Jul. 2010, pp. 1-6.

Egon Ostrosi, "Generalised Design for Optimal Product Configuration", Int J Adv Manuf Technol (2010) 49:13-25.

Anantaram Balakrishnan et al., "Operations Research" (1999) 47(3): 395-409.

Daniel F. Baldwin et al., "An Integrated Computer Aid for Generating and Evauating Assembly Sequences for Mechanical Products", IEEE Transactions on Robotics and Automation, vol. 7, No. 1, Feb. 1991, pp. 78-94.

Akirua Tsuneya, "New Management Technologies for Blade Servers", Fujitsu Scientific and Technical Journal, 40.1 (2004): 141-150.

Liang-Jie Zhang et al., "CCOA: Cloud Computing Open Architecture", 2009 IEEE Conference on Web Services, pp. 607-616.

Ing-Yi Chen et al., "A Reconfigurable Software Distribution Framework for Smart Living Environments", 2007 International Conference on Multimedia and Ubiquitous Engineering (MUE '07).

* cited by examiner

| Cluster | Candidate image | Configuration steps required | Cost | |
|---|---|---|---|---|
| C1 | C1₁ | None (3 endpoints) | 25 | |
| C1 | C1₂ | Install mon agent (2 endpoints) | 13 | Best choice for image |
| C1 | C1₃ | Install mon agent, remove user ids (1 endpoint) | 37 | |
| C1 | C1₄ | Uninstall mon agent (3 endpoints) | | |
| C1 | C1₅ | None (2 endpoints) Remove user ids (1 endpoint) | | |
| C1 | C1₆ | Create user ids, uninstall mon agent (3 endpoints) Create user ids (2 endpoints) None (1 endpoint) | | |
| C2 | C2₁ | Create user ids (1 endpoint) | 5 | |
| C2 | C2₂ | None (3 endpoints) | 3 | Best choice for image |
| C2 | C2₃ | None (1 endpoint) | | |
| C2 | C2₄ | Remove user ids (3 endpoints) | | |

Cost assumption: "uninstall mon agent" is 4 units; "install mon agent" is 8 units; "create user ids" is 5 units, "remove user ids" is 1 unit Cluster C1: C1₁, C1₂, C1₃, C1₄, C1₅, C1₆
Cluster C2: C2₁, C2₂, C2₃, C2₄

FIG. 5

SERVER BUILD OPTIMIZATION

BACKGROUND

1. Technical Field

The present disclosure relates to building of servers, and more particularly to methods and systems to optimize building of servers.

2. Discussion of Related Art

A server build is one of the must have services offered by Information Technology (IT) service providers. An enterprise server build means creating a new distributed server instance running an operating system (OS), system management tools, potentially middleware and databases, so it can support a client application or workload. It also needs to be patched up to date and hardened by security policies according to enterprise standards. There are many methods to build an enterprise grade server. In a first method, an instance is created from a master image with everything (e.g., master image includes all necessary system management tools, middleware, databases, patches, etc.). In the first method, provisioning cycle time is short and defects associated with the provisioning are minimized. However, the first method introduces management and storage overhead, which increases exponentially with more virtual machine (VM) images. In a second method, only the image of a bare OS is installed, and all the other necessary system management tools, middleware, databases are loaded later and all the other necessary configurations are performed later. However, in the second method, provisioning cycle time is long and error rates may be high.

Thus, there is a need for methods and systems that can better optimize building of servers.

BRIEF SUMMARY

According to an exemplary embodiment of the inventive concept, a method to perform server provisioning on a plurality of computer systems to generate a plurality of target virtual machines is provided. The method includes: obtaining configurations from a pool comprising at least one existing candidate virtual server or server image through a discovery process; performing a clustering analysis on the configurations to group the configurations into at least two groups; and for each group, selecting a configuration from among the configurations of the group as a candidate virtual machine image, determining a cost of actions required to be performed on the candidate virtual image to result in target virtual machines with a same configuration as the configurations of the group; and selecting the candidate virtual image with the lowest cost.

According to an exemplary embodiment of the inventive concept, a computer program product is provided to perform server provisioning on a plurality of computer systems to generate a plurality of target virtual machines. The computer program product includes a computer readable storage medium having program instructions embodied therewith. The program instructions are executable by a computer to perform the above method.

According to an exemplary embodiment of the inventive concept, a method for selecting design templates is provided. The method includes: performing a clustering analysis on a plurality of design instances to group the design instances into at least two groups; for each group, selecting a design instance from among the design instances of the group as a candidate template; determining a cost of actions required to be performed on the candidate template to result in target design instances with a same configuration as the design instances of the group; and selecting the candidate template with the lowest cost.

BRIEF DESCRIPTION OF THE SEVERAL VIEWS OF THE DRAWINGS

Exemplary embodiments of the invention can be understood in more detail from the following descriptions taken in conjunction with the accompanying drawings in which:

FIG. 5 illustrates examples of determining the costs of actions that are required to be applied to candidate images to result in desired target servers;

DETAILED DESCRIPTION

Embodiments of the present invention relate to methods and/or systems to determine the best strategy to capture/build an optimal server image, and corresponding sequence of change actions to optimize the server provisioning cost.

Figure 1:
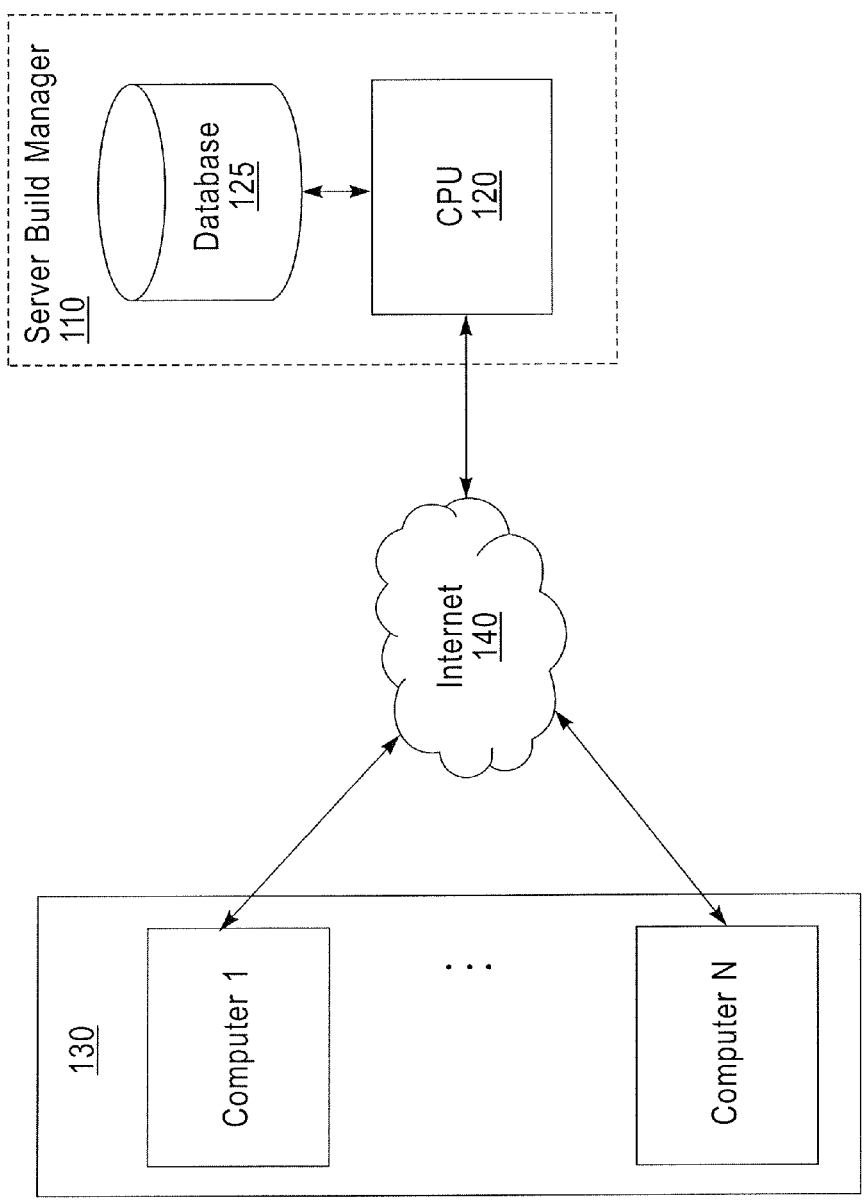
FIG. 1 illustrates a system capable of building one or more servers according to an exemplary embodiment of the invention.

FIG. 1 illustrates a server build manager configured to build servers according to an exemplary embodiment of the invention. Referring to FIG. 1, the server build manager 110 includes a central processing unit (CPU) 120 and a database 125. The server build manager 100, using CPU 120, is configured to communicate with computers 130 across a network 140 such as the Internet to build one or more servers on these computers 130.

Figure 2:
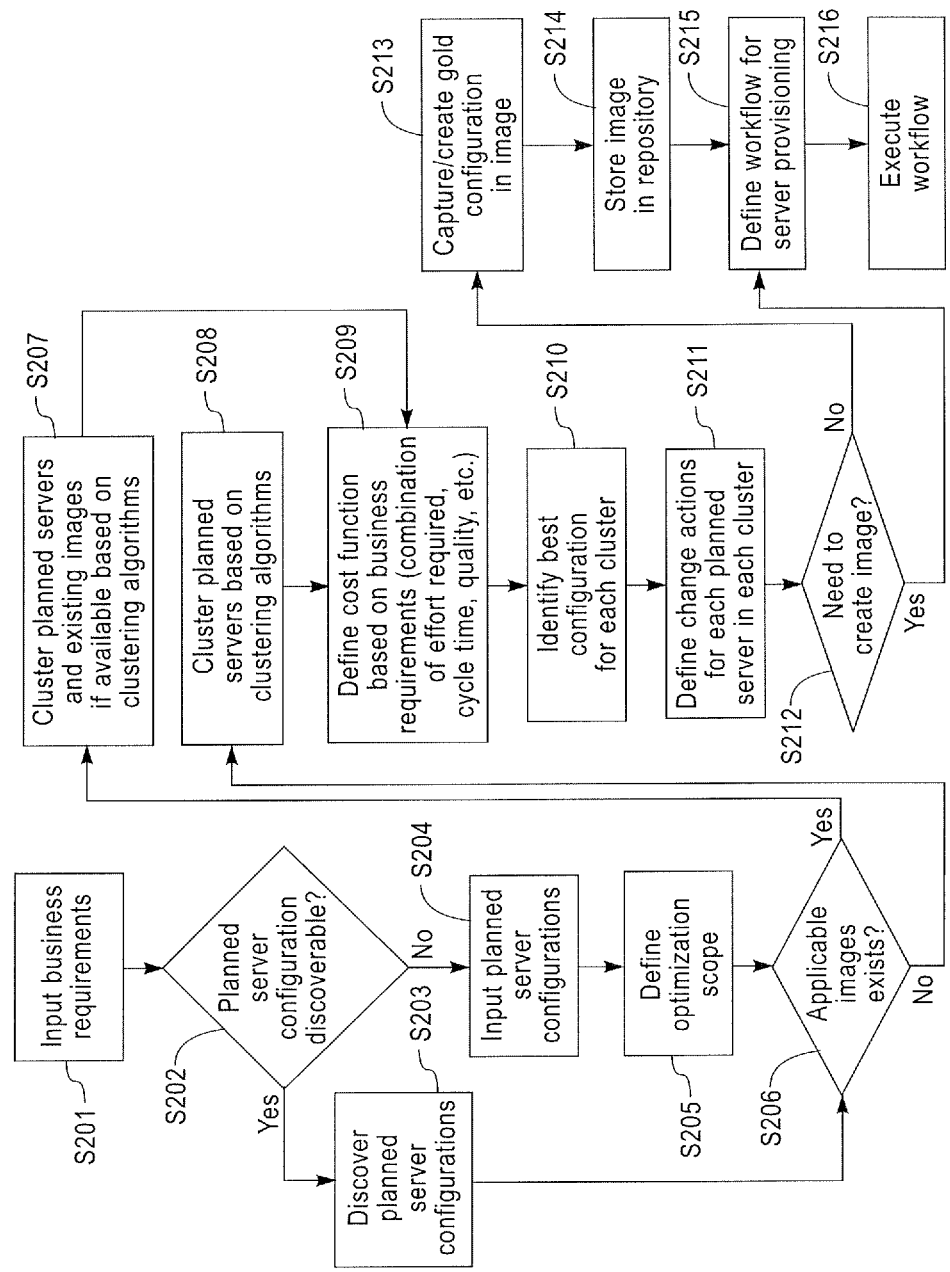
FIG. 2 illustrates a system flow diagram of the system according to an exemplary embodiment of the invention.

FIG. 2 illustrates a flow diagram that may be used by the server build manager 110 to build the servers according to an exemplary embodiment of the invention. Referring to FIG. 2, the flow diagram begins with the input of one or more business requirements for the building of the servers (S201).

In an exemplary embodiment, the entered business requirement indicates that the servers need to be built in a certain amount of time. For example, if a server is not in use for one hour of the day, the requirement could indicate that the build be completed in one hour.

In exemplary embodiment, the entered business requirement indicates that the servers need to be built so that the total cost does not exceed a threshold amount. For example, the business requirement could specify that no more than a threshold amount of dollars be spent to pay the IT professionals to perform the server build.

In an exemplary embodiment, the entered business requirement indicates that the servers need to be built to have a certain amount of quality. For example, the more configuration and applications that need to be manually loaded, the more errors could be introduced into the server being built.

Further, various combinations of the above described requirements with various different weightings may be considered. Examples of the requirements include speed, cost of labor, and amount of defects.

The business requirements may be input manually by a user into a graphical user interface (GUI) of the server build manager 110 or automatically loaded by the manager 110 from database 125.

After the requirements have been input, the server build manager 110 determines whether the planned server configuration is discoverable (S202). A planned server configuration can include configuring one or more existing computers to have a certain configuration that exists already on another one of the existing computers, or to a new configuration that does not presently exist. Examples of a planned server configuration may include at least one of the following, but are not limited to: installing/de-installing an application/OS, installing/de-installing a patch, installing/de-installing a database, and creating/removing User IDs.

If a planned server configuration is discoverable, the server build manager 101 can automatically determine which server(s) to build and what sequence of actions to perform to accomplish the respective builds. If a planned server configuration is not discoverable, the server build manager 110 requires that a user enter information indicating which of the computers 130 need to be updated and the desired configuration on each computer.

If the server build manager 110 determines that the planned server configuration is discoverable, the server build manager 110 performs a process to automatically discover the planned server configuration (S203). As an example, the discovery can be performed by a tool like IBM's Tivoli Application Dependency Discovery Manager (TADDM), or by a script within the server, or by a query configuration database that stores the detailed configuration for a particular server.

Figure 3:
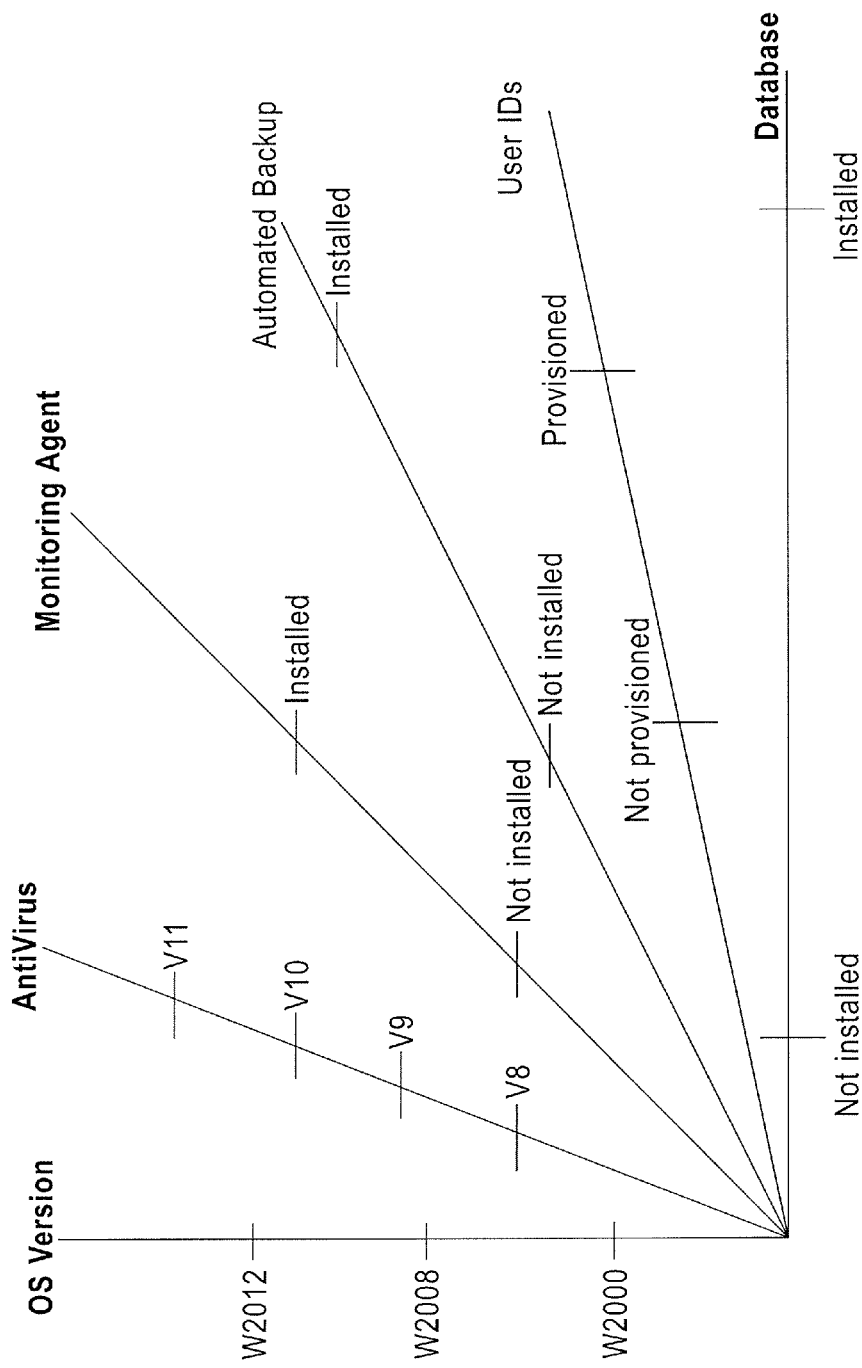
FIG. 3 illustrates an example of a server space that may be considered by the system.

FIG. 3 illustrates an example of a multidimensional server space, which can be used to represent one or more of the planned server configurations. This server space includes different versions of an operating system, different version of an antivirus program, servers with a monitoring agent installed, servers without a monitoring agent installed, servers with an automated backup program installed, servers without an automated backup program installed, servers with User IDs provisioned (created), servers without User IDs provisioned, servers installed with a database, and servers without a database installed. For example, one of the planned server configurations could be a server with a W2012 OS version, a V10 antivirus version, no monitoring agent installed, no automated backup installed, no user IDs provisioned, and a database installed. The server space may include other states such as the type of file system, the size of the file system, etc.

If the server build manager 110 determines that the planned server configuration is not discoverable, the server build manager 110 may query a user to input its planned server configuration (S204). For example, the server build manager 110 may include a GUI that can be operated by a user to identify the computers 130 that need to be updated and the desired configurations.

Once the planned server configuration has been input, the optimization scope is defined (S205). The optimization scope means the desirable configurations or server space dimensions for optimization (e.g., backup agent or not, userid provisioned or not, file system is to be c:\ and d:\ or just d:\, etc.)

Next, the server build manager 110 determines whether applicable server images exist (S206). An example of a applicable server images is a boot image. A boot image is a type of disk image. A disk image is a computer file. One or more servers can be built from a boot image. When a boot image is transferred to a boot device (e.g., one of computers 130), it allows the associated hardware to boot. The boot image may include the operating system, utilities and diagnostics, middleware, applications, user account data and permissions, as well boot and data recovery information. For example, if servers on three of the computers 130 were previously built using a first server image, and servers on two of the computers 130 were previously built using a second server image, and the first and second server images are stored on one or more of the computers 130, the server build manager 110 can download the server images across the network 140 for storage in the database 125.

If the server build manager 110 determines that applicable images do exist, the server build manager 110 performs a clustering analysis on the planned server configurations and the existing server images (S207). If the applicable server images do not exist, the server build manager 110 performs a clustering analysis on only the planned server configurations (S208).

The clustering analysis is a task of grouping a set of objects in such a way that objects in the same group (called a cluster) are more similar to each other than those in other groups (clusters).

The clustering can be done manually by an expert or automatically using a k-means clustering algorithm or a hierarchical clustering algorithm. The distance between points in server space can be based on cost, effort, time, or other metrics that characterizes the activities needed to change the server from one configuration to another. The distance can be asymmetric. For example, the time to install an application can be different from the time to uninstall the application. Asymmetric distances can be averaged in various ways (e.g., arithmetic mean, geometric mean, etc.) for purposes of clustering. The clustering distance metric may be chosen in various ways such as Euclidean, Manhattan, discrete, or graph manner.

Figure 4:
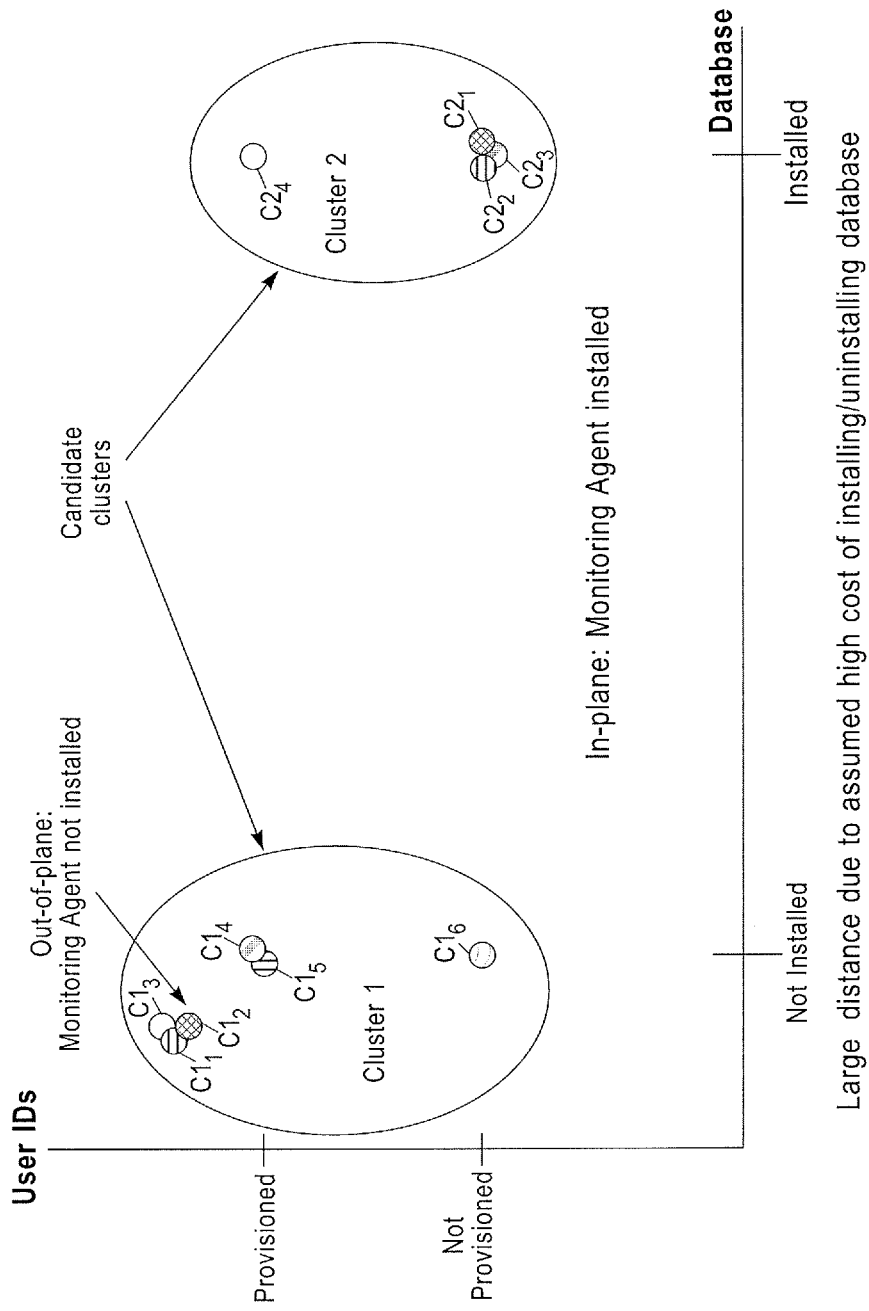
FIG. 4 illustrates an example of a clustering analysis being performed on several server configurations.

FIG. 4 is an example of a clustering analysis that was performed on several planned server configurations to create two clusters C1 and C2. The first cluster C1 includes six planned server configurations $C1_1$, $C1_2$, $C1_3$, $C1_4$, $C1_5$, and $C1_6$ where a database is not installed and the second cluster C2 includes four planned server configurations $C2_1$, $C2_2$, $C2_3$, and $C2_4$ where the database is installed. Five of the server configurations of the first cluster $C1_1$-$C1_5$ have provisioned User IDs and one of the server configurations $C1_6$ does not have User IDs provisioned. Among the five server configurations $C1_1$-$C1_5$ of the first cluster C1 that have User IDs provisioned, three server configurations $C1_1$-$C1_3$ are present without a monitoring agent installed and two server configurations $C1_4$-$C1_5$ are present with a monitoring agent installed. The server configuration $C1_6$ of the first cluster C1 without provisioned user IDs also has no monitoring agent configured. Three of the server configurations $C2_1$-$C2_3$ of the second cluster C2 do not have user IDs provisioned and the remaining server configuration $C2_4$ of the second cluster C2 has user IDs provisioned.

UserIds can be provisioned manually by a user logging onto a new server and running a command to add a user (e.g., useradd) and a command to set a password (e.g., passwd). UserIds can be provisioned automatically using a script that is injected onto a new server and executed automatically. The script would run the above mentioned commands. UserIds can be removed in a similar manner manually using a command and automatically using a script.

Referring back to FIG. 2, the server build manager 110 defines a cost function based on a particular combination of the business requirements (S209). When the cost function is predefined and stored in database 125, this step can be performed by the server build manager 110 loading the cost function from database 125. The server build manager 110 may include a 7GUI that enables a user to create or update the cost function using the available business requirements. An exemplary cost function is described at the bottom of FIG. 5. For example, in FIG. 5, un-installing a monitoring agent costs 4 units, installing a monitoring agent costs 8 units, creating user IDs (provisioning user IDs) costs 5 units, and removing user IDs (removing provisioning of user IDs) costs 1 unit. Additional cost measures may be used in the cost function, such as the cost of installing a database, the cost of un-installing a database, the cost of installing a virus scan program, the cost of un-installing a virus program, etc.

After the cost function is defined, the server build manager 110 identifies the best configuration for each cluster (S210). FIG. 5 illustrates an example of identifying the best configuration for each of clusters C1 and C2. The first cluster C1 includes three groups (e.g., sub-clusters), a first group (e.g., sub-cluster) including server configurations $C1_1$-$C1_3$, a second group including server configurations $C1_4$-$C1_5$, and a third group including server configuration $C1_6$ The second cluster C2 includes two groups, a first group including $C2_1$-$C2_3$ and a second group including $C2_4$.

A candidate server configuration is selected from the available server configurations $C1_1$-$C1_6$ of the first cluster C1. If $C1_1$ is selected as the candidate server image, no configuration steps (actions) need to be performed on $C1_2$-$C1_3$ since $C1_1$-$C1_3$ have the same configuration. Since server configuration $C1_1$ lacks a monitoring agent, three server configurations $C1_4$-$C1_6$ require a monitoring agent, and it costs 8 units to install each monitoring agent on three candidate images, it will cost 24 units to create three target server configurations like the candidate server configuration, but installed with the monitoring agent (e.g., $C1_4$ and $C1_5$). Further, since server configuration $C1_1$ has user IDs provisioned while $C1_6$ has no user IDs provisioned, it will cost 1 unit to remove the user ID provisioning from one of the three target server configurations to create a new target server configuration like the target candidate server configuration, but without the user IDs (e.g., $C1_6$). Thus, if one of the first three server configurations $C1_1$-$C1_3$ is chosen as the candidate server configuration, the total cost is 25 units (e.g., 24 units+1 unit) to make the remaining server configurations of the first cluster C1 from the candidate server configuration. The cost is 13 units if one of server configurations $C1_4$-$C1_5$ is chosen as the candidate server configuration and the cost is 37 units if the server image $C1_6$ is chosen as the candidate server configuration. Thus, since 13 units is lower than 25 units and 37 units, the optimal candidate server configuration would be either $C1_4$ or $C1_5$ For the second cluster C2, the optimal candidate server configuration ends up being $C2_4$ because the total cost for removing user IDs is so low relative to the cost for creating user IDs. The optimization scope may indicate how each of the actions are to weighted (e.g., 4 units to un-install a monitoring agent, 8 units to install a monitoring agent, etc.).

Once the best (optimal) server configuration has been identified for each cluster, the server build manager 110 defines the change actions for each planned server configuration in each cluster (S211). For example, if server configuration $C1_4$ is identified as the best server configuration for the first cluster C1, the sequence of actions would be to load a server image representing the server configuration $C1_4$ on 6 of computers 130 (e.g., $1^{st}$-$6^{th}$), perform an un-install of the monitoring agent on the $1^{st}$-$3^{rd}$ computers, perform no changes to the $4^{th}$ and $5^{th}$ computer, and then to perform a removal of the user IDs on the $6^{th}$ computer. For example, if server configuration $C2_4$ is identified as the best image for the second cluster C2, the sequence of actions would be to load a server image representing the server configuration $C2_4$ on 4 of computers 130 ($7^{th}$-$10^{th}$), perform a creation of user IDs on the $7^{th}$-$9^{th}$ computers, and to perform no change to the $10^{th}$ computer.

Once the sequence of actions has been defined, the server build manager 110 determines whether it needs to create a server image (S212). If a server image that corresponds to the best server configuration for one of the clusters is not present, a server image is generated from the best server configuration (S213). This, server image may be referred to as the gold image and may be stored in database 125 (S214). If the server image that corresponds to the best server configuration for one of the clusters is present (e.g., retrievable from one of computers 130 across network 130 or stored in database 125), it can be retrieved. In an embodiment, the server image is created using an image creation tool like VMWare that to creates a snapshot from a running instance.

The server build manager 110 then defines a workflow for performing a server provisioning based on the gold image to result in all of the desired target new servers (image instances) (S215). The workflow is based on the previously identified actions. The server build manager 110 then executes the workflow to create the desired target server (S216). The workflow may be written in any format that a workflow engine can interpreted and execute. As an example, the workflow could be written in a Business Process Execution Language, which is an XML-based language that allows Web services in a service-oriented architecture to interconnect and share data. In another example, the workflow could be written in a tool specific language such as hot template, if using an open stack heat engine to execute.

Figure 6:
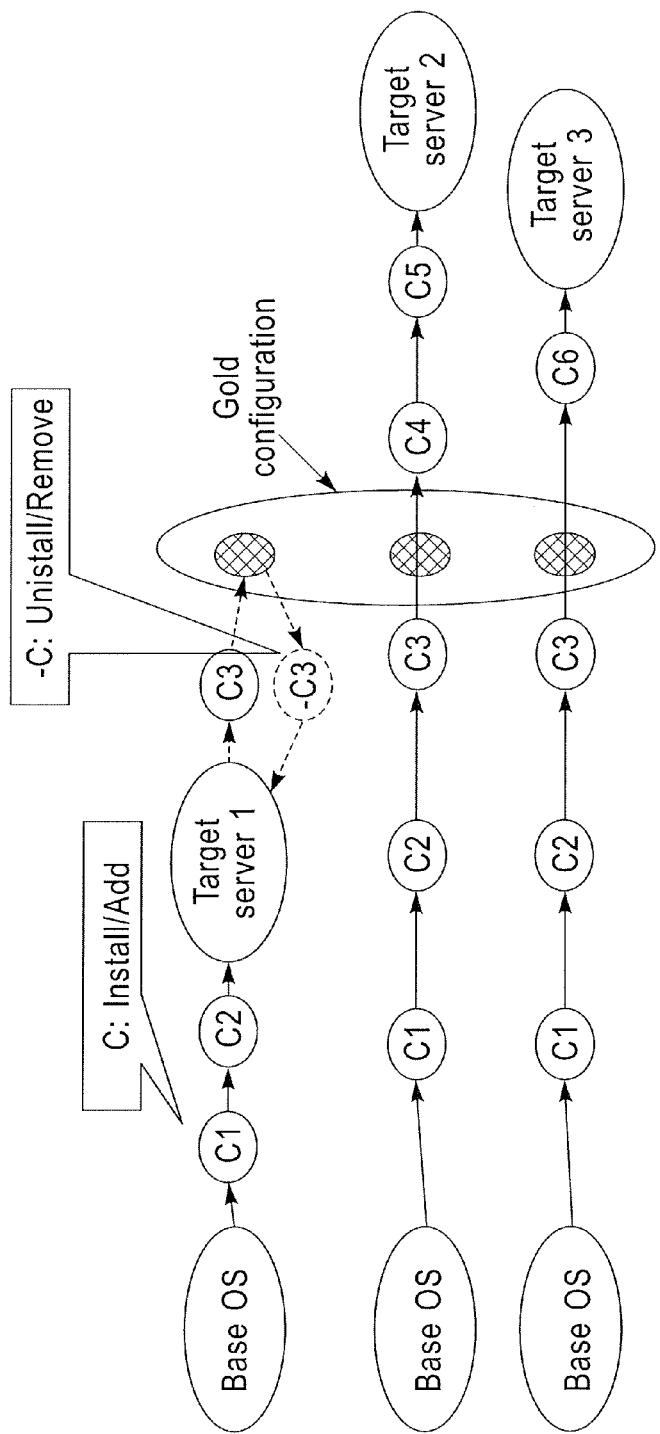
FIG. 6 illustrates differences between an optimal server configuration determined by an exemplary embodiment of the invention and the target servers.

FIG. 6 illustrates an example of three servers being built from the gold image, which includes components C1, C2, and C3 and the base OS. Since the Target server 1 does not include component C3, once the gold image is loaded on a first computer among computers 130 by the server build manager 110 in which the Target server 1 is to be created, component C3 is removed by the server build manager 110 from the first computer. Since the Target server 2 includes components C4 and C5 in addition to the gold image, once the gold image is loaded on a second computer among computers 130 by the server build manager 110 in which the Target server 2 is to be created, components C4 and C5 are added by the server build manager 110 to the second computer. Since the Target server 3 includes component C6, once the gold image is loaded on a third computer among computers 130 by the server build manager 110 in which the Target server 3 is to be created, component C6 is added by the server build manager 110 to the third computer.

At least one embodiment of the invention provisions servers with a best strategy that reduces the cost to build servers, improves the quality of the built servers, and reduces the amount of time required to build the servers.

In an exemplary embodiment, the above described server images are virtual machine images. A virtual machine is an OS or application environment that is installed on software which imitates dedicated hardware. The end user has the same experience on a virtual machine as they would have on dedicated hardware. Thus the candidate images selected by the server build manager 110 can be virtual machine images.

Referring back to FIG. 1, in an exemplary embodiment, the database 125 is configured to store provisioning criteria, desired server configurations (e.g., list of server components and attribute values) and desired quantities of each configuration. In an exemplary embodiment, the server build manager 110 includes a similarity process that clusters desired server configurations in multidimensional server component/attribute space into subset domains by degree of similarity, each subset domain having one or more of the desired server configurations.

In an exemplary embodiment, the server build manager 110 includes an optimization process for each subset domain that determines a virtual machine image that can be modified optimally in aggregate with respect to the provisioning criteria to satisfy each desired server configuration in the subset domain. For example, server configurations having provisioned user IDs, without a database installed, and without a monitoring agent install such as C11-C13 could be referred to as a first subset domain, and a server configuration without userIDs provisioned, without a database installed, and with a monitoring agent installed could be referred to as a second subset domain. The optimization process, for each subset domain: selects a configuration as a candidate image; identifies the sequence of actions to create each desired server configuration in the subset domain from the candidate image; evaluates, based on the sequence of actions, the provisioning criteria for all desired server configurations in the subset domain; and repeats these steps to identify the best candidate image and corresponding sequence of actions to provision each desired server configuration from the candidate image.

The optimization process, for each subset domain, may consider pre-existing virtual machine images within the subset domain or in nearby subset domains. The optimization process may avoid a recommendation of new images that are too close to pre-existing images.

The server component attribute dimensions include one or more of the following: an operating system, operating system version, operating system patches, file systems, user IDs, user groups, security and compliance settings, applications, and application versions.

The similarity process uses one or more of the following methods: k-means clustering, hierarchical clustering, and density based clustering. The similarity process uses one or more of the following distance measures: Euclidean, discrete, Manhattan, and graph.

The provisioning criteria include one or more of the following: cost to provision (e.g., cost of material and labor), time to provision (e.g., cycle time), risk of provisioning (e.g., risk of error), quality of provisioning.

In an exemplary embodiment, the database 125 stores design instantiation criteria, desired design instances (e.g., list of design components and attribute values) and desired quantities of each design.

The similarity process clusters desired design instances in multi-dimensional design component/attribute space into subset domains by degree of similarity, each subset domain having one or more of the desired design instances.

The optimization process, for each subset domain, determines a design template that can be modified optimally in aggregate with respect to the design instantiation criteria to satisfy each desired design instance in the subset domain.

In an exemplary embodiment, the optimization process, for each subset domain: selects a desired design instance as a candidate template; identifies the sequence of actions to instantiate each desired design instance in the subset domain from the candidate template; evaluates, based on the sequence of actions, the design instantiation criteria for desired design instances in the subset domain; and repeats these steps to identify the best candidate template and corresponding sequence of actions to instantiate each desired design instance from the candidate template.

In an exemplary embodiment, the optimization process, for each subset domain, considers pre-existing design templates within the subset domain or in nearby subset domains. The optimization process may avoid a recommendation of new templates that are close to pre-existing templates.

The design templates may include one or more of the following: product design templates, product assembly templates, and service design templates. The design instantiation criteria may include one or more of the following: cost to instantiate design template, cost to modify design template to create desired design instance, time to modify design template to create desired design instance, risk of modifying design template to create desired design instance. The sequence of actions to create each desired design instance in the subset domain from the candidate template can include actions that remove components from the candidate template as well as actions that add components to the candidate template.

Figure 7:
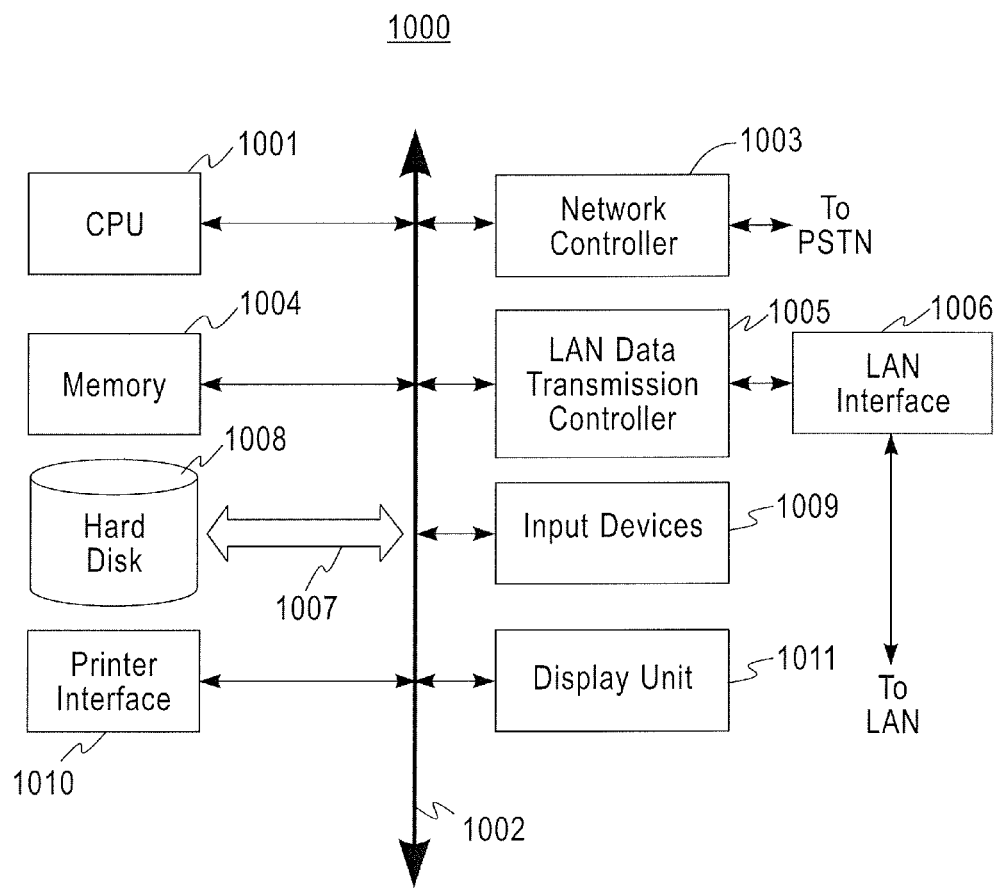
FIG. 7 illustrates an example of a computer system capable of implementing methods and systems according to embodiments of the disclosure.

FIG. 7 illustrates an example of a computer system, which may be used execute any of the above-described methods, according to exemplary embodiments of the invention. For example, the method of FIG. 2 may be implemented in the form of a software application running on the computer system. Further, portions of the methods may be executed on one such computer system, while the other portions are executed on one or more other such computer systems. Examples of the computer system include but are not limited to a mainframe, personal computer (PC), a handheld computer, and a server. The software application may be stored on a computer readable media (such as hard disk drive memory 1008) locally accessible by the computer system and accessible via a hard wired or wireless connection to a satellite or a network, for example, a local area network, or the Internet, etc.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk 1008 (e.g., a digital video recorder), via a link 1007. CPU 1001 may be the computer processor that performs the above described methods.

Referring to FIGS. 1-7, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method to perform server provisioning on a plurality of computer systems to generate a plurality of target virtual servers, the method comprising:
receiving one or more business requirements for building the target virtual servers;
defining a cost function based on the one or more business requirements, the cost function specifying a cost value associated with each of a plurality of actions;
obtaining a plurality of server configurations, each associated with a respective service image, from a pool comprising a plurality of server images through a discovery process;

performing a clustering analysis on the plurality of server configurations to generate a plurality of clusters, where each cluster includes server configurations that are similar to each other;
identifying an optimal server configuration for each cluster by:
identifying a plurality of sub-clusters within the cluster, wherein each sub-cluster includes one or more server configurations that are identical;
for each of the plurality of sub-clusters:
selecting the server configuration of the sub-cluster as a candidate server configuration;
identifying sequences of actions required to be performed on the server image associated with the candidate server configuration to result in target virtual servers having the same server configurations as the server configurations of the other sub-clusters;
determining a total cost value of performing the sequences of actions required to be performed on the server image based on the cost value associated with each action;
selecting the server configuration of the sub-cluster with the lowest total cost as the optimal server configuration for the cluster;
installing the server image associated with the optimal server configuration of each cluster on the plurality of computer systems; and
performing corresponding sequences of actions on the plurality of computer systems to generate the plurality of target virtual servers.

2. The method of claim 1, wherein one of the actions performs one of an install of a software application or a removal of the software application.

3. The method of claim 2, wherein the software application is one of an operating system, a file system, an agent, a database application, a web application, a software patch, or a virus scan program.

4. The method of claim 1, wherein one of the actions performs one of creation of user identifications (IDs) or removal of the user IDs.

5. The method of claim 1, wherein the clustering analysis comprises one of a k-means clustering, a hierarchical clustering, or density-based clustering.

6. The method of claim 1, wherein the clustering analysis uses one of a Euclidean distance measure, a discrete distance measure, a Manhattan distance measure, or a graph distance measure.

7. The method of claim 1, wherein the cost of a given action among the actions is based on an amount of time taken to perform the given action.

8. The method of claim 1, wherein the cost of a given action among the actions is based on a price of labor charged to perform the given action.

9. The method of claim 1, wherein the cost of a given action among the actions is based on how likely performance of the given action is to introduce an error.

10. A computer program product to perform server provisioning on a plurality of computer systems to generate a plurality of target virtual servers, the computer program product comprising a computer readable storage medium having program instructions embodied therewith, the program instructions executable by a computer to perform a method comprising;
receiving one or more business requirements for building the target virtual servers;
defining a cost function based on the one or more business requirements, the cost function specifying a cost value associated with each of a plurality of actions;
obtaining a plurality of server configurations, each associated with a respective service image, from a pool comprising a plurality of server images through a discovery process;
performing a clustering analysis on the plurality of server configurations to generate a plurality of clusters, where each cluster includes server configurations that are similar to each other;
identifying an optimal server configuration for each cluster by:
identifying a plurality of sub-clusters within the cluster, wherein each sub-cluster includes one or more server configurations that are identical;
for each of the plurality of sub-clusters:
selecting the server configuration of the sub-cluster as a candidate server configuration;
identifying sequences of actions required to be performed on the server image associated with the candidate server configuration to result in target virtual servers having the same server configurations as the server configurations of the other sub-clusters;
determining a total cost value of performing the sequences of actions required to be performed on the server image based on the cost value associated with each action;
selecting the server configuration of the sub-cluster with the lowest total cost as the optimal server configuration for the cluster;
installing the server image associated with the optimal server configuration of each cluster on the plurality of computer systems; and
performing corresponding sequences of actions on the plurality of computer systems to generate the plurality of target virtual servers.

11. The computer program product of claim 10, wherein one of the actions performs one of an install of a software application or a removal of the software application.

12. The computer program product of claim 11, wherein the software application is one of an operating system, a file system, an agent, a database application, a web application, a software patch, or a virus scan program.

13. The computer program product of claim 10, wherein one of the actions performs one of creation of user identifications (IDs) or removal of the user IDs.

14. The computer program product of claim 10, wherein the clustering analysis comprises one of a k-means clustering, a hierarchical clustering, or density-based clustering.

15. The computer program product of claim 10, wherein the clustering analysis uses one of a Euclidean distance measure, a discrete distance measure, a Manhattan distance measure, or a graph distance measure.

* * * * *